(12) United States Patent
Statham

(10) Patent No.: US 7,467,474 B1
(45) Date of Patent: Dec. 23, 2008

(54) METHOD AND APPARATUS FOR PIPE ALIGNMENT TOOL

(76) Inventor: Jay P. Statham, 343 Park Hill Dr., Milpitas, CA (US) 95035

( * ) Notice: Subject to any disclaimer, the term of this patent is extended or adjusted under 35 U.S.C. 154(b) by 0 days.

(21) Appl. No.: 11/230,176

(22) Filed: Sep. 19, 2005

(51) Int. Cl.
*G01B 11/27* (2006.01)
*G01B 5/25* (2006.01)
(52) U.S. Cl. .............................. 33/286; 33/412; 33/529
(58) Field of Classification Search .................. 33/286, 33/DIG. 21, 412, 529
See application file for complete search history.

(56) References Cited

U.S. PATENT DOCUMENTS

| | | | | |
|---|---|---|---|---|
| 4,773,164 A | * | 9/1988 | Taylor et al. .................. | 33/520 |
| 5,446,535 A | * | 8/1995 | Williams ..................... | 33/286 |
| 5,461,793 A | * | 10/1995 | Melville ...................... | 33/286 |
| 5,568,265 A | * | 10/1996 | Matthews ..................... | 33/286 |
| 6,286,219 B1 | * | 9/2001 | Palumbo, II .................. | 33/286 |
| 6,360,446 B1 | * | 3/2002 | Bijawat et al. ................ | 33/451 |
| 6,371,626 B1 | * | 4/2002 | Addona ....................... | 33/520 |
| 6,393,708 B1 | * | 5/2002 | Culver et al. ................. | 33/286 |
| 6,457,246 B1 | * | 10/2002 | Frazer et al. ................. | 33/286 |
| 6,643,019 B1 | | 11/2003 | Jeanneret | |
| 6,804,897 B1 | * | 10/2004 | Horn ........................... | 33/286 |
| 6,915,582 B1 | * | 7/2005 | Engels ........................ | 33/286 |
| 2002/0038513 A1 | * | 4/2002 | Kallesen et al. .............. | 33/286 |
| 2002/0062570 A1 | * | 5/2002 | Palumbo et al. ............... | 33/286 |
| 2002/0166249 A1 | * | 11/2002 | Liao .......................... | 33/286 |
| 2002/0170190 A1 | * | 11/2002 | Wetterlind ................... | 33/286 |
| 2004/0111902 A1 | * | 6/2004 | Fletcher ...................... | 33/286 |

* cited by examiner

*Primary Examiner*—Christopher W Fulton
(74) *Attorney, Agent, or Firm*—Heimlich Law; Alan Heimlich, Esq.

(57) ABSTRACT

A method and apparatus for a pipe alignment tool have been described. A laser is inserted into the end of a pipe and projects a laser beam indicative of the longitudinal axis of the pipe.

2 Claims, 8 Drawing Sheets

US 7,467,474 B1

METHOD AND APPARATUS FOR PIPE ALIGNMENT TOOL

FIELD OF THE INVENTION

The present invention pertains to conduit, piping, and related structures. More particularly, the present invention relates to a method and apparatus for a pipe alignment tool.

BACKGROUND OF THE INVENTION

Conduit, electrical conduit, pipes, and other "plumbing" often must be routed through and/or attached to other structures. For example, electrical conduit in a house may need to be routed through wall studs in order to reach electrical boxes, outlets, etc.

Copper (or ABS, PVC, steel, etc.) piping may need to be routed through or around floor joists to, for example, a water faucet.

In industrial applications, overhead pipe racks may carry multiple pipes for electricity, wires and cables, gases, compressed air, water, etc.

When routing any of these "pipes" through a structure, such as a wall, an opening needs to be made to allow the pipe to pass. Trying to figure out where to drill a hole in the wall is often difficult for pipes that may already be in place, for example, already hung from a ceiling. Additionally, there may not be a convenient way to measure from floors or walls where the hole is needed, or there may be obstacles in the way of making a measurement. This presents a problem.

BRIEF DESCRIPTION OF THE DRAWINGS

The invention is illustrated by way of example and not limitation in the figures of the accompanying drawings in which.

DETAILED DESCRIPTION

The invention, as exemplified in various embodiments, illustrates a method and apparatus for a pipe alignment tool.

Figure 1:
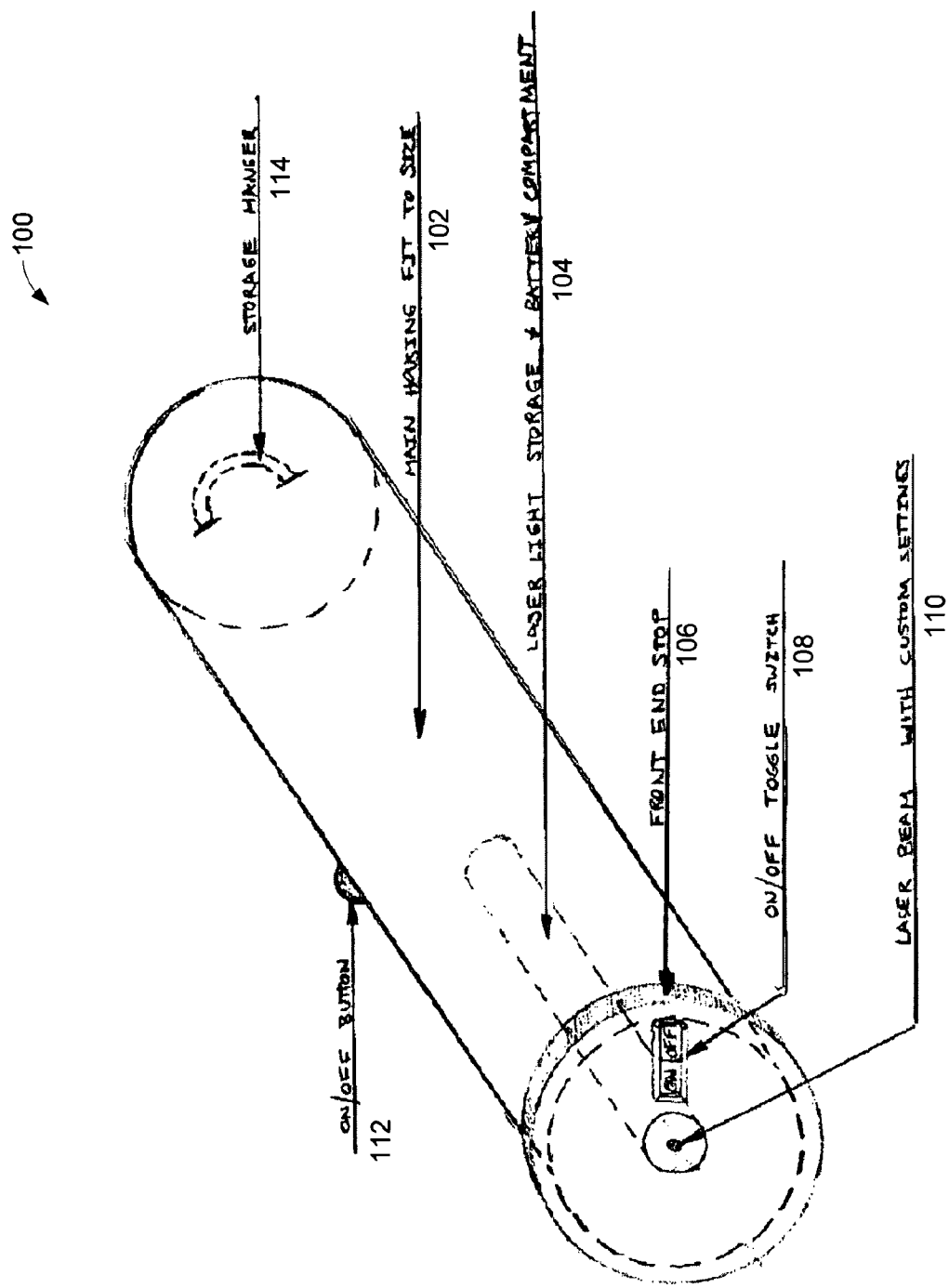
FIG. 1 illustrates one embodiment of the invention also showing a uniform size.

FIG. 1 illustrates one embodiment of the invention 100 also showing a uniform size. At 102 is a main housing. This housing 102 is generally cylindrical in shape and is sized to slide within a pipe. For example, one common electrical conduit (also called Electrical Metallic Tubing or EMT) has a trade size designation of ½ inch. For use with such a sized conduit, housing 102 would be sized to fit snugly within the inside diameter of the conduit. At 104 is a laser light source that has a storage area for a power source, such as a battery compartment. At 106 is a front end (pipe) stop. This stop 106 allows the main housing 102 to slide within a pipe yet not be lost. For example, if a pipe is positioned vertically, then the stop 106 would prevent the invention 100 from falling deep within the pipe. At 108 is an on/off switch. As shown 108 is a slide switch, however, the invention is not so limited and the on/off switch may be a toggle, push button, etc. At 110 is where the laser beam would exit the invention. The laser beam may be of a custom shape, size, intensity, etc. At 112 is a momentary button type on/off switch. When main housing 102 is inside a pipe enough so that button 112 is within the pipe, button 112 may be pushed in thereby turning on the laser. Switch 112 may operate in conjunction with switch 108 to control whether the laser is turned on. At 114 is an optional convenience hanger for storing the invention 100.

In operation, the invention 100 may be situated (placed) in the end of a pipe and laser beam 110 may be a small circular pattern (dot). Turning on the laser 110 will then illuminate where the pipe is aimed. For example, if the invention is placed in the end of a pipe which is mounted in a pipe rack and which needs to be routed through a wall, then the laser beam would illuminate the wall where the pipe would penetrate if it was extended to the wall. In this way the location of where an opening needs to be made may be seen. A user of the invention, optionally, could mark the wall, for example, with a pencil where the opening is needed.

Figure 2:
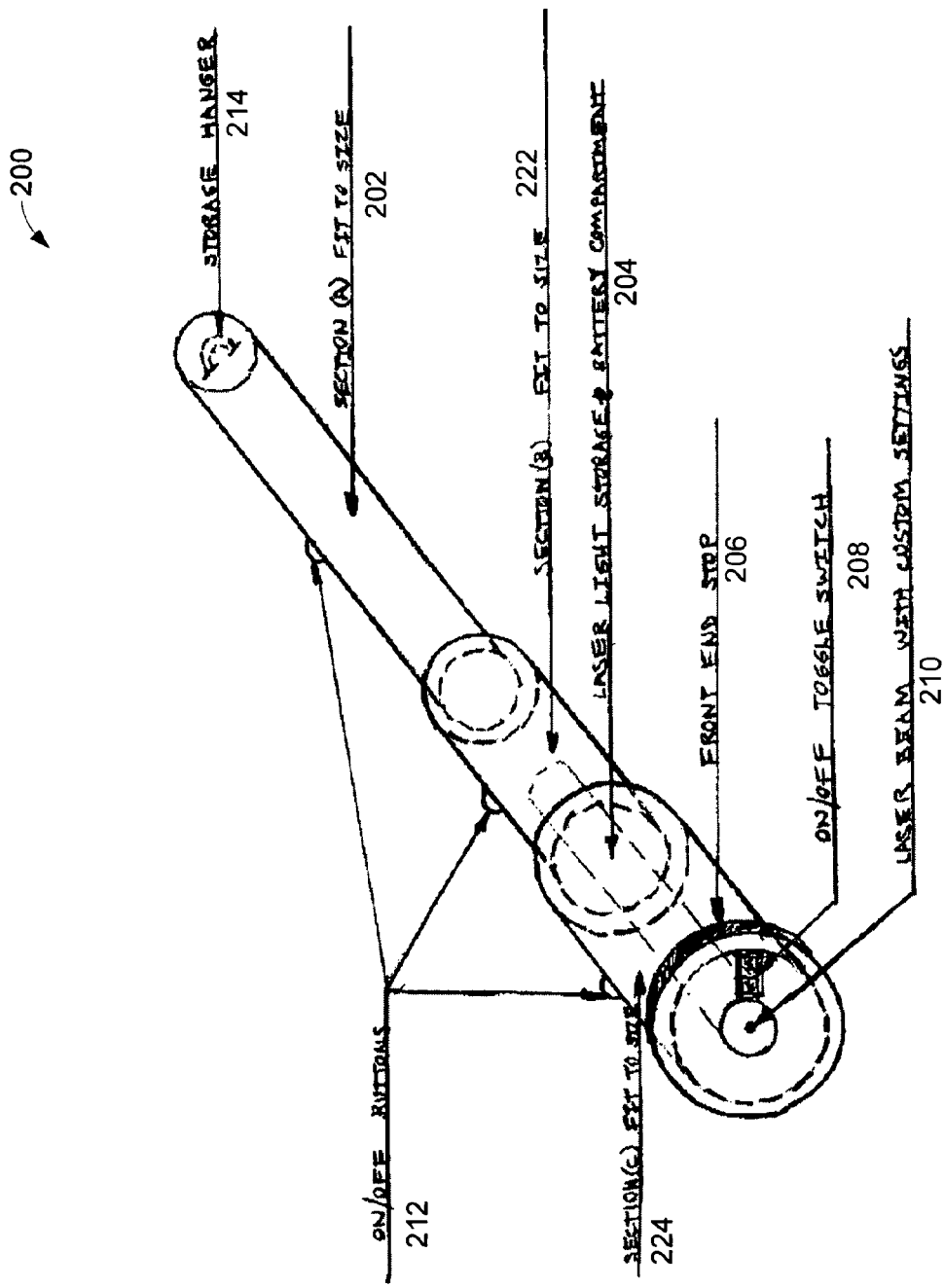
FIG. 2 illustrates one embodiment of the invention also showing stepped sizes.

FIG. 2 illustrates one embodiment of the invention 200 also showing stepped sizes. At 202 is a first housing section (A) with a first diameter. At 222 is a second housing section (B) with a second diameter. At 224 is a third housing section (C) with a third diameter. These housing sections (A, B, C) 202, 222, and 224 respectively are generally cylindrical in shape and each is sized to slide within a pipe of a different inside diameter ID). For example, in one embodiment of the invention 200, section A 202 may be sized to fit within a ½ inch size pipe, section B 222 may be sized to fit within a ¾ inch size pipe, and section C 224 may be sized to fit within a 1 inch size pipe. Thus, the invention may be used with a variety of different sized pipes for locating the longitudinal axis of the pipes. At 204 is a laser light source that has a storage area for a power source, such as a battery compartment. At 206 is a front end pipe stop. This stop 206 prevents the invention 200 from sliding deep within a pipe where it may be difficult to retrieve. For example, in one embodiment, where section C fits a 1 inch size pipe, if the 1 inch size pipe is located vertically, then the stop 206 would prevent the invention 200 from falling deep within the pipe. At 208 is on/off switch. As shown 208 is a slide switch, however, the invention is not so limited and the on/off switch may be a toggle, push button, etc. At 210 is where the laser beam would exit the invention. The laser beam may be of a custom shape, size, intensity, etc. At 212 are shown three momentary button type on/off switches. When main housing 202 is inside a pipe tight enough that the button 212 located in section A 202 is depressed then it may turn on the laser. If section A 202 is within a larger pipe then it may not be depressed, however, the button 212 in section B 222 may be depressed turning on the laser. Switches 212 may operate in conjunction with switch 208 to control whether the laser is turned on. At 214 is an optional convenience hanger for storing the invention 200.

In operation, the invention 200 may be slid into the end of a pipe which will snuggly fit one of the sections and laser beam 210 may be a cross-hair pattern. Turning on the laser 210 will then illuminate a cross-hair where the pipe is aimed. For example, if the invention is in the end of a electrical conduit which needs to be routed through a stud in a wall, then the laser beam would illuminate the stud where the pipe would penetrate if it was extended. In this way the location of where an opening needs to be made may be seen. A user of the invention, optionally, could mark the location, for example, with a pilot drill hole of where a larger opening is needed.

Figure 3:
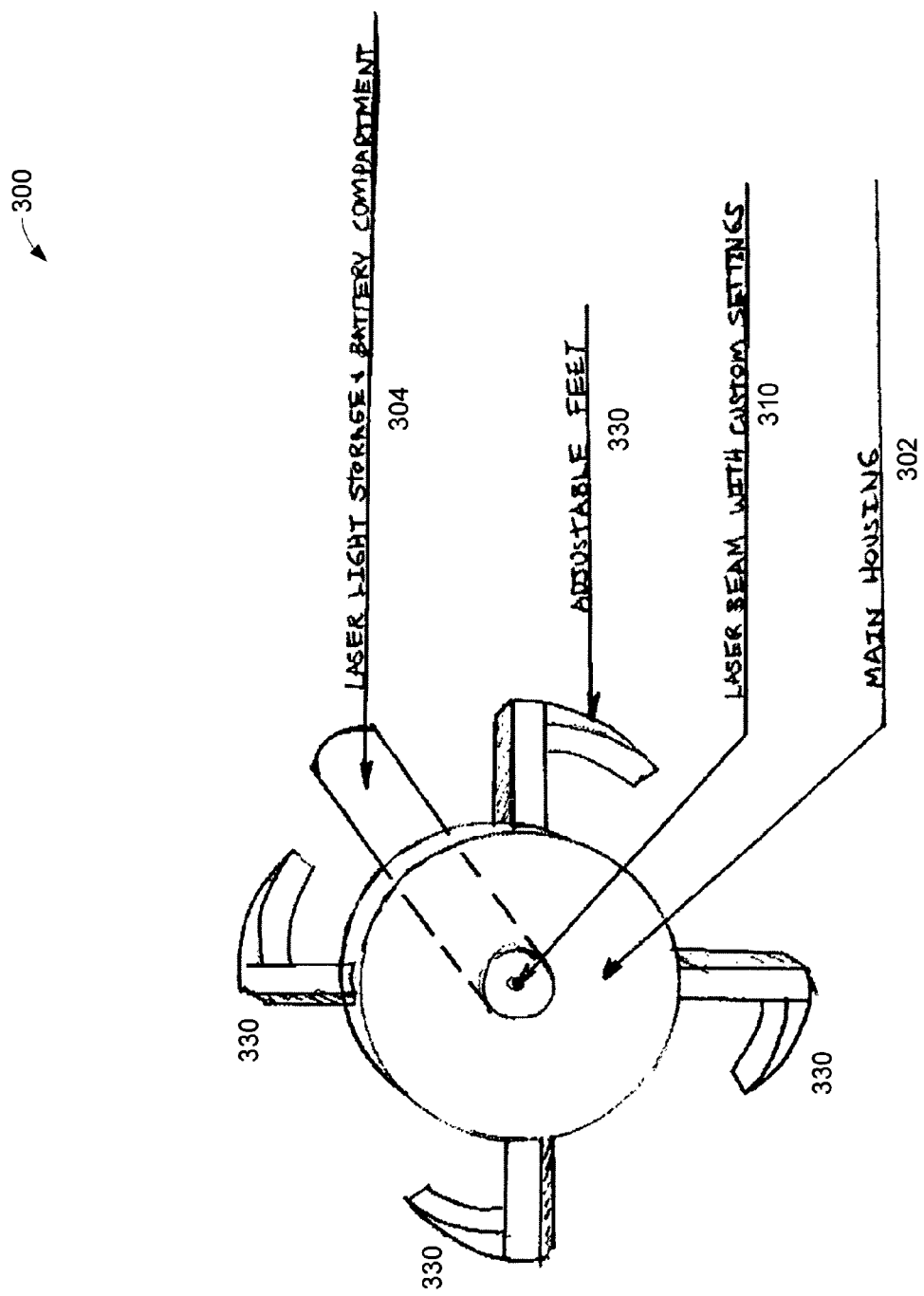
FIG. 3 illustrates one embodiment of the invention also showing adjustable feet.

FIG. 3 illustrates one embodiment of the invention 300 also showing adjustable feet 330. Main housing 302 has a laser with a storage battery compartment 304. The laser beam with custom settings emerges from 310. Main housing 302 has adjustable feet 330. By adjusting the feet 330, the invention 300 may be centered in a pipe. Since the feet 330 are adjustable, the invention 100 may be placed into pipes of different sizes. In one embodiment, the feet 330 are mechanically interconnected so that they extend and retract in synchronization so that laser beam 310 indicates the centerline of a pipe into which it is placed.

Figure 4:
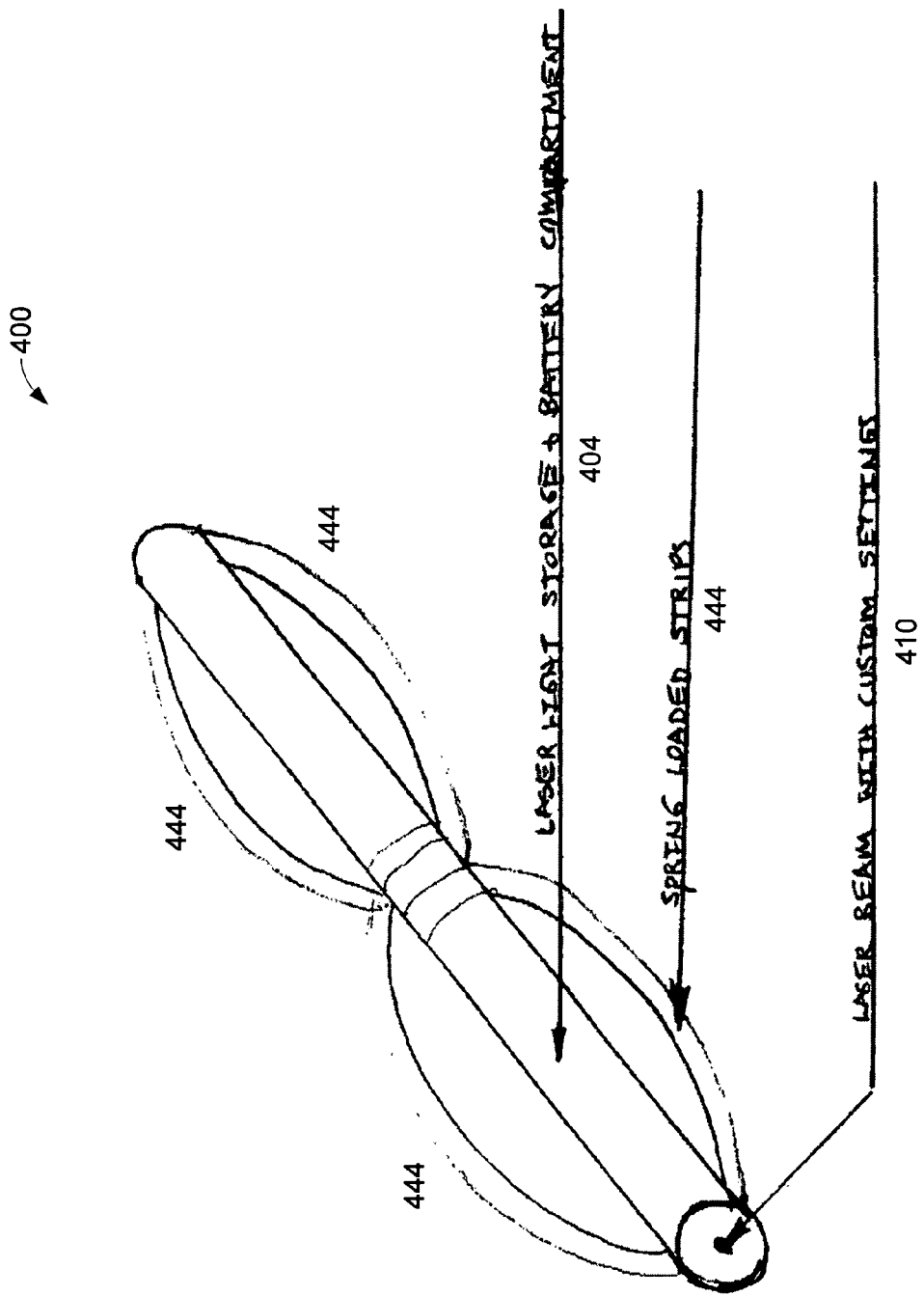
FIG. 4 illustrates one embodiment of the invention also showing spring strips.

FIG. 4 illustrates one embodiment of the invention 400 also showing spring strips 444. In this embodiment, the laser light storage and battery compartment 404 forms the main body of the invention 400. The laser beam exists at 410 and may have custom settings such as a cross-hair, a bulls-eye, a dot, etc. Spring strips 444 are attached to the laser light 404 in such a way as to enable the strips to bend when invention 400 is inserted into a tube or pipe. Strips 444 are arranged, in one embodiment as two groups (one group near the laser exit end, one group at the opposite end) of three strips equally spaced on the circumference of the laser light 404 (for example, looking into the laser beam, one strip at 0 degrees, another at 120 degrees, and another at 240 degrees). In this way the invention 400 is substantially self-centering when placed into a pipe. Other arrangements of the spring strips are also possible, for example, four equally spaced strips for the front and rear of the laser light 404.

Figure 5:
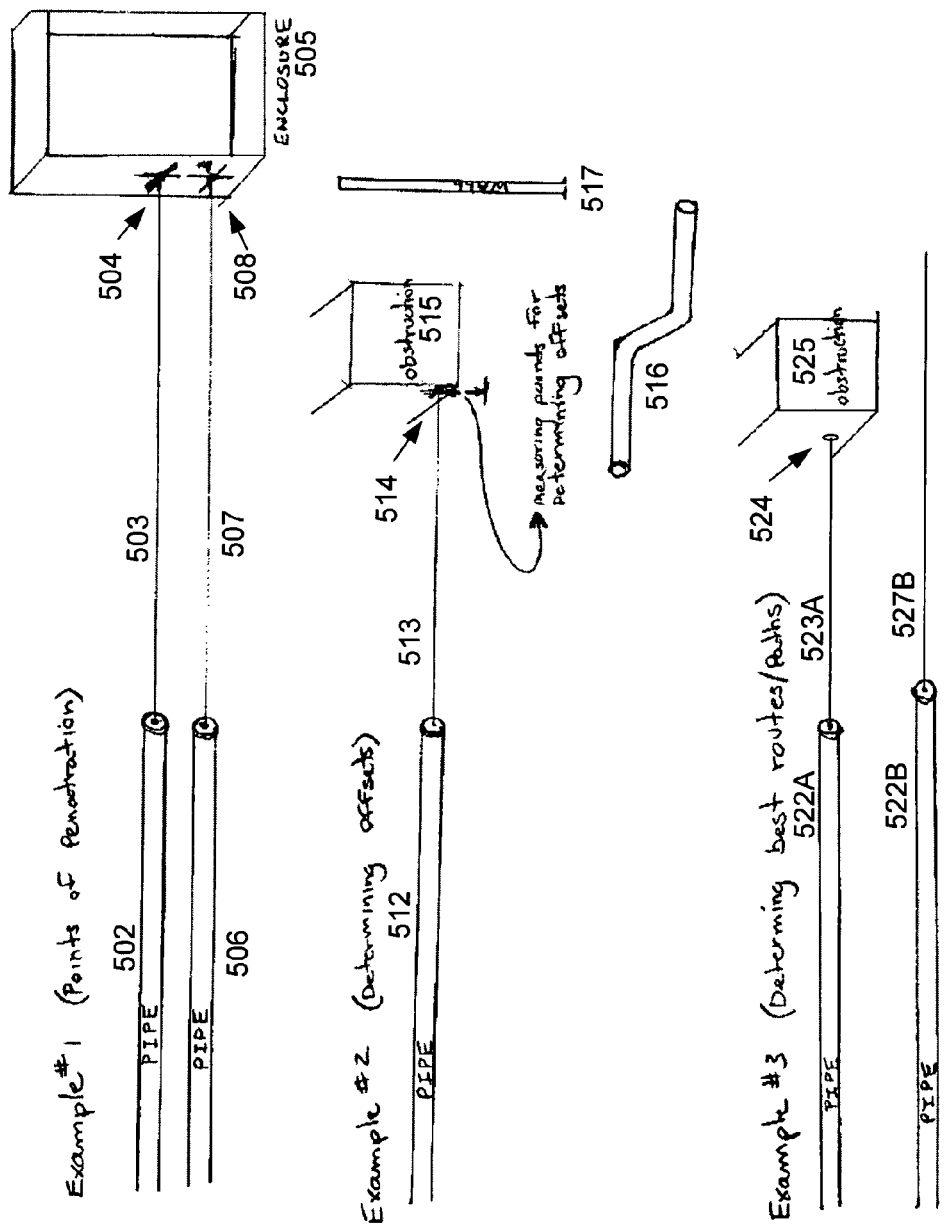
FIG. 5 illustrates one embodiment of the invention also showing various methods of use.

FIG. 5 illustrates one embodiment of the invention also showing various methods of use.

In the first, Example #1, the invention is used to show points of penetration. For example, one embodiment of the invention is placed in pipes 502 and 506, resulting in beams 503 and 507, indicating where at 504 and 508 respectively the pipes 502 and 506 if extended would enter enclosure 505. In this illustration the beams 503 and 507 are cross-hair patterns.

In the second, Example #2, the invention is used to determine offsets. For example, one embodiment of the invention is placed in pipe 512 and turned on. The resulting beam 513 indicates that the pipe 512 if extended would hit obstruction 515 at point 514 rather than the wall 517. By showing (via beam 513) where the pipe 512 would hit the obstruction 515, a user may measure an offset distance from point 514 for a pipe 516 so that it may be routed around the obstruction 515. In this example then, a pipe 516 joined properly to 512 will bypass obstruction 515 and may then reach the wall 517.

In the third, Example #3, the invention is used to determine the best route or path for a pipe. Here the invention is used to help position the pipe to avoid an obstruction. For example, in position A, with the invention in pipe 522A beam 523A indicates that it will hit obstruction 525 at point 524. By moving the pipe to a second position B, the pipe 522B now shows that it will not hit obstruction 525 because the beam 527B of the invention is not hitting the obstruction 525. In this example the pattern of the beam 523A (and 527B) is a center dot with a circle around it (as seen on the side of obstruction 525 at point 524).

Figure 6:
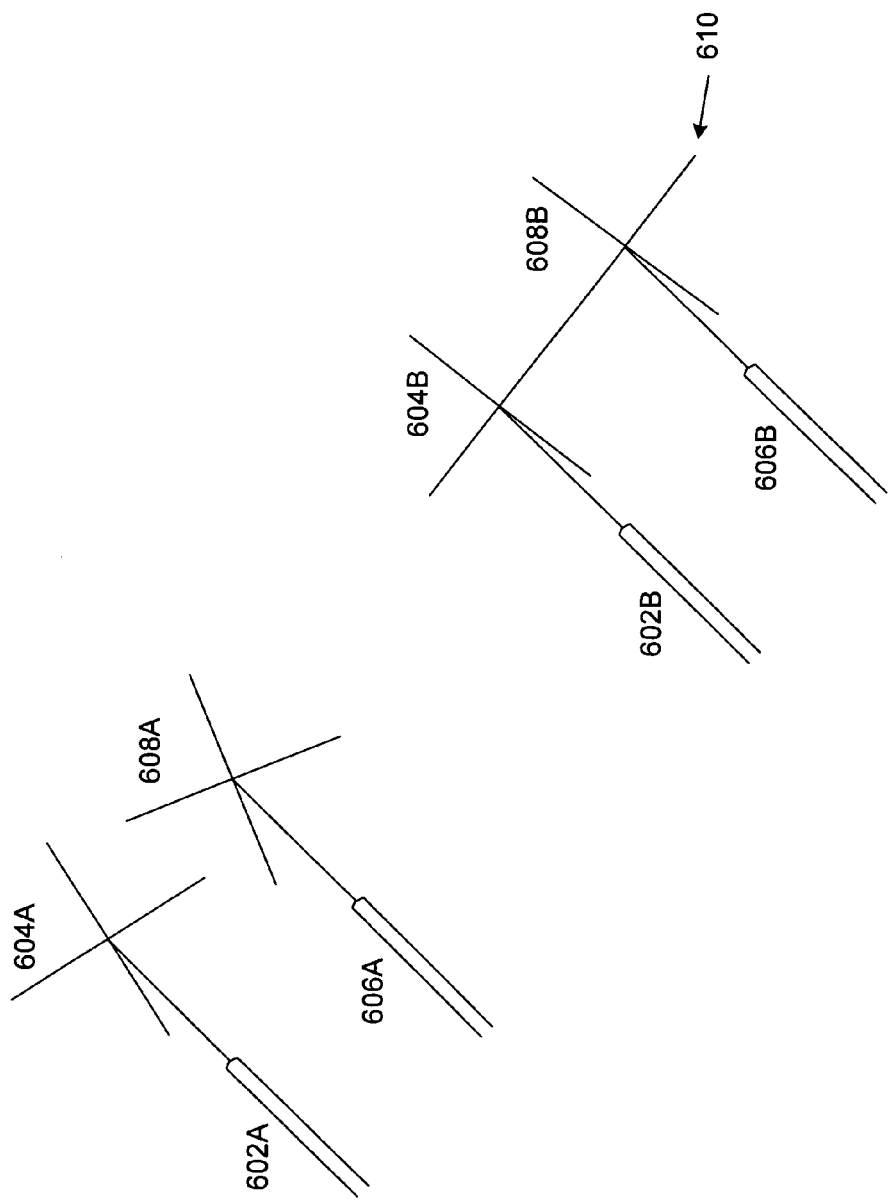
FIG. 6 illustrates one embodiment of the invention also showing cross-hair alignment.

FIG. 6 illustrates one embodiment of the invention also showing cross-hair alignment. In one embodiment of the invention the invention may be rotated inside the pipe (for example by grasping in FIG. 1, front end stop 106). In this way, if the emitting laser is projecting a cross-hair pattern; the cross-hair pattern projection on a surface may be rotated. Using the invention in two or more pipes, will allow for determining the center-line alignment with the pipes. For example if the pipes are mounted at a 30 degree angle with respect to the horizon in a rack then by aligning the cross-hairs so that some of their hairs coincide will result in a "center-line" from one pipe to the other at the same angle as the pipes are mounted. Here in FIG. 6, at a first position A, pipes 602A and 606A are at an angle with respect to each other and the horizontal and have the invention inserted in them and are projecting respectively the patterns 604A and 608A on, for example, a wall. By rotating the invention in pipes 602A and 606A the patterns on the wall 604A and 608A will also rotate. After rotation for example, to position B, pipes 602B and 606B have patterns 604B and 608B respectively, where a "leg" of each pattern aligns with the other forming a longer straight line 610 which is a centerline of the respective pipes. Using this line 610 may be useful. For example if a slot needs to be cut out to allow a row of pipes to pass through an object and the pipes are in a straight line, for example, between end pipes 602B and 606B, then this line 610 would indicate the angle for the slot.

Figure 7:
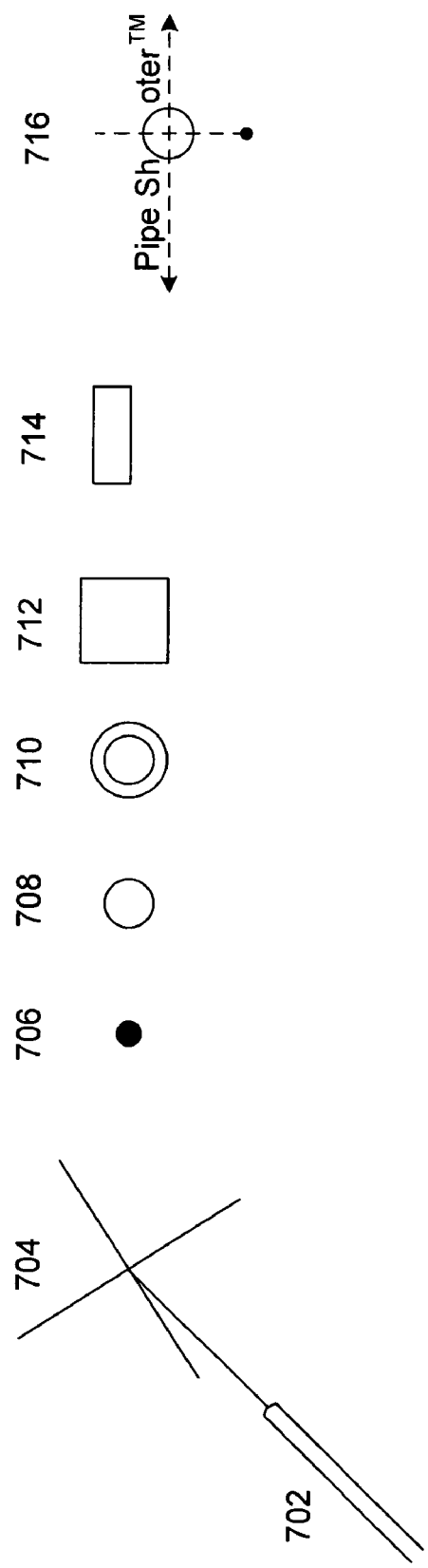
FIG. 7 illustrates one embodiment of the invention also showing various projected patterns.

FIG. 7 illustrates one embodiment of the invention also showing various projected patterns. The invention 702 is projecting a pattern on a wall such as the cross-hair pattern at 704. Other patterns may be, but are not limited to, a dot 706, a circle 708, concentric circles 710, a square 712, a rectangle 714, or even a stylized logo such as Pipe Shooter with a TM superscript and a circle and broken cross-hairs that in the horizontal direction (as illustrated) have arrow ends, and in the top vertical direction (as illustrated) ends in a line and in the bottom vertical direction (as illustrated) ends in a dot.

Figure 8:
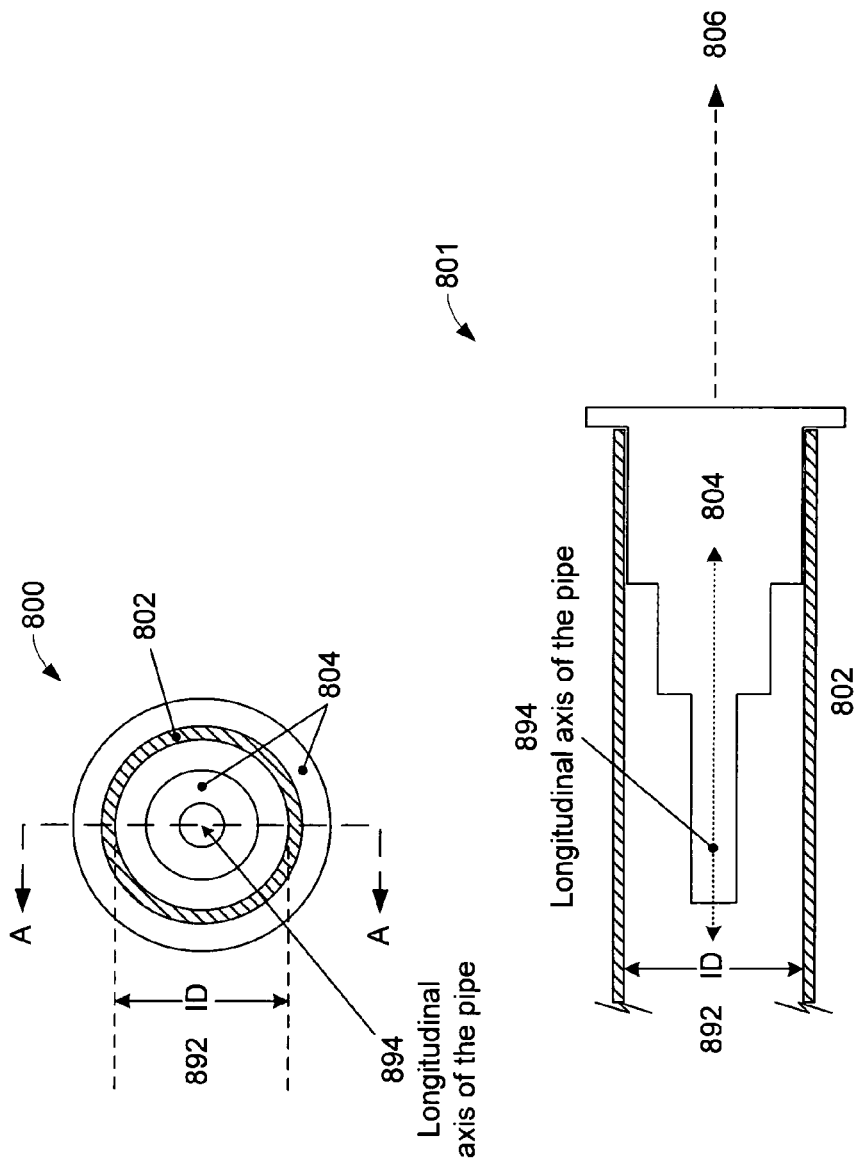
FIG. 8 illustrates one embodiment of the invention showing various views.

FIG. 8 illustrates one embodiment of the invention showing various views. At view 800 is a pipe 802 having an inside diameter (ID) 892 and a longitudinal axis 894 which runs down the center of the pipe 802 (normal to the surface of the FIG. 8). 804 is one embodiment of the invention inserted into the pipe 802. Section A-A denotes the view at 801. At 801 is shown a Section A-A view of the pipe 802. Also indicated at 801 is the ID 892 of the pipe 802 as well as an embodiment of the invention 804 inserted into the end of the pipe 802. Shown for illustration is the path of a laser beam 806 centered in the pipe 802 and projecting in a direction parallel to the length of the pipe 802 denoted as the longitudinal axis of the pipe 894. The longitudinal axis of the pipe 894 "runs" directly down the center of the pipe 802. Thus the laser beam 806 indicates where the center of the pipe 802 would be if the pipe 802 were extended.

While the invention has been illustrated with respect to a round pipe, the invention is not so limited. For example, in a square channel a variation of the invention as illustrated in FIG. 4 may have groups of four spring strips so that the emitted laser beam would indicate the center position of the square channel and a projection such as 712 in FIG. 7 may be projected.

One of skill in the art will appreciate that the present invention has many variations only a small sample of which are illustrated in the Figures. For example, referring to FIG. 2, a variation on invention 200 may have circular and rectangular sections. Another variation of the invention may have dimensions allowing it to fit into English and Metric standard pipes.

Thus a method and apparatus for a pipe alignment tool have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for a pipe alignment tool have been described.

What is claimed is:

1. An apparatus comprising:
a laser in a stepped housing, not having external threads or pawls, capable of being placed in the end of a pipe projecting a beam indicative of the longitudinal axis of said pipe, wherein said stepped housing is capable of holding said laser centered within said pipe, and a switch in communication with said laser, said laser also capable of being in communication with a power source capable of powering said laser, and wherein said switch is in communication with two or more push-button switches extending beyond the outer surface of said stepped housing.

2. The apparatus of claim 1 wherein said two or more push-button switches are momentary switches.

\* \* \* \* \*